United States Patent [19]

Bolha

[11] 3,938,542
[45] Feb. 17, 1976

[54] PLURAL RANGE PRESSURE REGULATOR CONSTRUCTION AND CAP ASSEMBLY THEREFOR

[75] Inventor: John J. Bolha, Greensburg, Pa.

[73] Assignee: Robertshaw Controls Company, Richmond, Va.

[22] Filed: Nov. 8, 1974

[21] Appl. No.: 522,320

[52] U.S. Cl. ............ 137/271; 251/337; 137/505.41
[51] Int. Cl.² .................................. F16K 31/12
[58] Field of Search ............ 137/15, 269, 271, 270, 137/315, 329, 505, 505.41, 505.42; 251/337

[56] References Cited
UNITED STATES PATENTS

| | | | |
|---|---|---|---|
| 1,393,348 | 10/1921 | Davenport | 251/337 |
| 1,448,221 | 3/1923 | Johnson | 251/337 |
| 2,470,327 | 5/1949 | Tener | 251/337 X |
| 2,631,600 | 3/1953 | Flanagan | 137/269 |
| 2,810,397 | 10/1957 | Olson et al. | 251/337 X |
| 3,062,525 | 11/1962 | Schutmaat | 251/337 X |
| 3,747,629 | 7/1973 | Bauman | 137/270 |
| 3,825,029 | 7/1974 | Genbauffe | 137/271 |

Primary Examiner—Martin P. Schwadron
Assistant Examiner—Robert J. Miller
Attorney, Agent, or Firm—Candor, Candor & Tassone

[57] ABSTRACT

In a plural range pressure regulator construction having a spring for acting on a flexible wall of the construction to provide one pressure range for the regulator construction when the spring is in a certain position thereof and for being stored in a removable cap of the construction so that the spring will be in another position thereof and will not act on the wall so as to permit the regulator construction to provide another range thereof, the improvement wherein the spring has a spring retainer secured to one end thereof with the spring retainer being adapted to be snap-fitted onto a projection of the cap whereby the cap and spring are removed in unison from the housing when it is desired to change the operating position of the spring.

16 Claims, 7 Drawing Figures

PLURAL RANGE PRESSURE REGULATOR CONSTRUCTION AND CAP ASSEMBLY THEREFOR

This invention relates to an improved plural range pressure regulator construction and cap assembly therefor.

It is well known from U.S. Pat. No. 3,825,029 to Genbauffe, that a pressure regulator construction can be provided wherein one of the springs thereof can be stored in an out-of-the-way position in a removable cap of the pressure regulator construction so that the spring will not act on the flexible wall thereof in order to permit the regulator construction to have one pressure range thereof with that stored spring being adapted to be disposed in another position in the regulator construction to act on the wall of the regulator construction and thereby provide another pressure range thereof.

However, it has been found according to the teachings of this invention that when removing such cap from such a plural range pressure regulator construction, there is a tendency for the cap and spring to become separated and thereby result in a losing of the spring during the changeover of the pressure regulator construction from one operating range thereof to another operating range thereof.

Therefore, it is a feature of this invention to provide improved means for maintaining the removable cap and changeover spring of the plural range pressure regulator construction secured together so that the same can be removed in unison when the spring is in at least one of the operating positions thereof.

In particular, one embodiment of this invention provides a plural range pressure regulator construction having a spring means for acting on a flexible wall of the construction to provide one pressure range for the regulator construction when the spring means is in a certain position thereof and for being stored in a removable cap of the construction so that the spring means will be in another position thereof and will not act on the wall so as to permit the regulator construction to provide another pressure range thereof. Securing means are provided for securing the spring means to the cap when the spring means is in either of the positions thereof whereby the spring means is adapted to be removed from the housing of the construction in unison with the cap when the cap is removed therefrom and the spring means is in either of the positions thereof.

Accordingly, it is an object of this invention to provide an improved plural range pressure regulator construction having one or more of the novel features set forth above or hereinafter shown or described.

Another object of this invention is to provide an improved cap assembly for such a plural range pressure regulator construction or the like.

Other objects, uses and advantages of this invention are apparent from a reading of this description which proceeds with reference to the accompanying drawing forming a part thereof and wherein.

Figure 1:
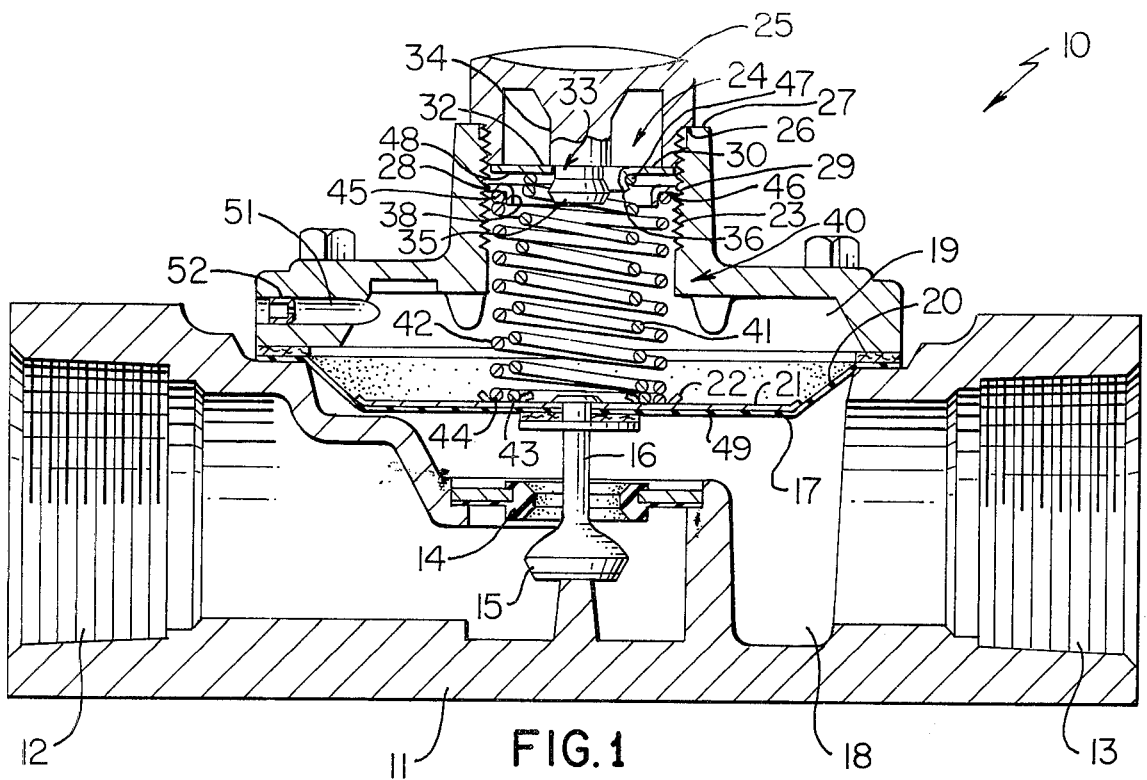
FIG. 1 is a cross-sectional view of the improved pressure regulator construction of this invention with the changeover spring thereof being in one operating position thereof.

While the various features of this invention are hereinafter described and illustrated as being particularly adapted to provide a plural range pressure regulator construction for a fuel burning apparatus, it is to be understood that the various features of this invention can be utilized singly or in any combination thereof to provide a plural range biasing means for other devices as desired.

Therefore, this invention is not to be limited to only the embodiment illustrated in the drawings, because the drawings are merely utilized to illustrate one of the wide variety of the uses of this invention.

Referring now to FIG. 1, the improved plural range pressure regulator construction of this invention is generally indicated by the reference numeral 10 and is of generally the same type of pressure regulator construction fully disclosed and claimed in the aforementioned U.S. Pat. No. 3,825,029 to Genbauffe.

The plural range pressure regulator construction 10 comprises a housing means 11 having an inlet 12 and an outlet 13 interconnected together by the resilient valve seat means 14 that is adapted to be controlled by a valve member 15 disposed on the inlet side of the valve seat 14 and being interconnected by a stem 16 thereof that projects through the valve seat 14 to a flexible diaphragm or wall 17 carried by the housing means 11 and cooperating therewith to define a chamber 18 on the outlet side of the diaphragm 17 and another chamber 19 on the other side 20 of the diaphragm 17 for a purpose hereinafter described.

The other side 20 of the diaphragm 17 has a metallic backup plate 21 secured thereto by the stem 16 of the valve member 15 in the manner illustrated with the backup plate 21 having a plurality of upwardly bent tabs 22 to provide a spring retaining function as will be apparent hereinafter.

The housing 11 has an internally threaded bore portion 23 leading to the chamber 19 thereof and defining a storage space 24 for a purpose hereinafter described, the storage space 24 having its upper end closed by a removal cover member or end cap 25 threaded to the threaded portion 23 and having an annular flange 26 thereof adapted to abut against the top surface 27 of the housing 11 to limit the amount of insertion of the cover member 25 into the housing means 11.

Figure 2:
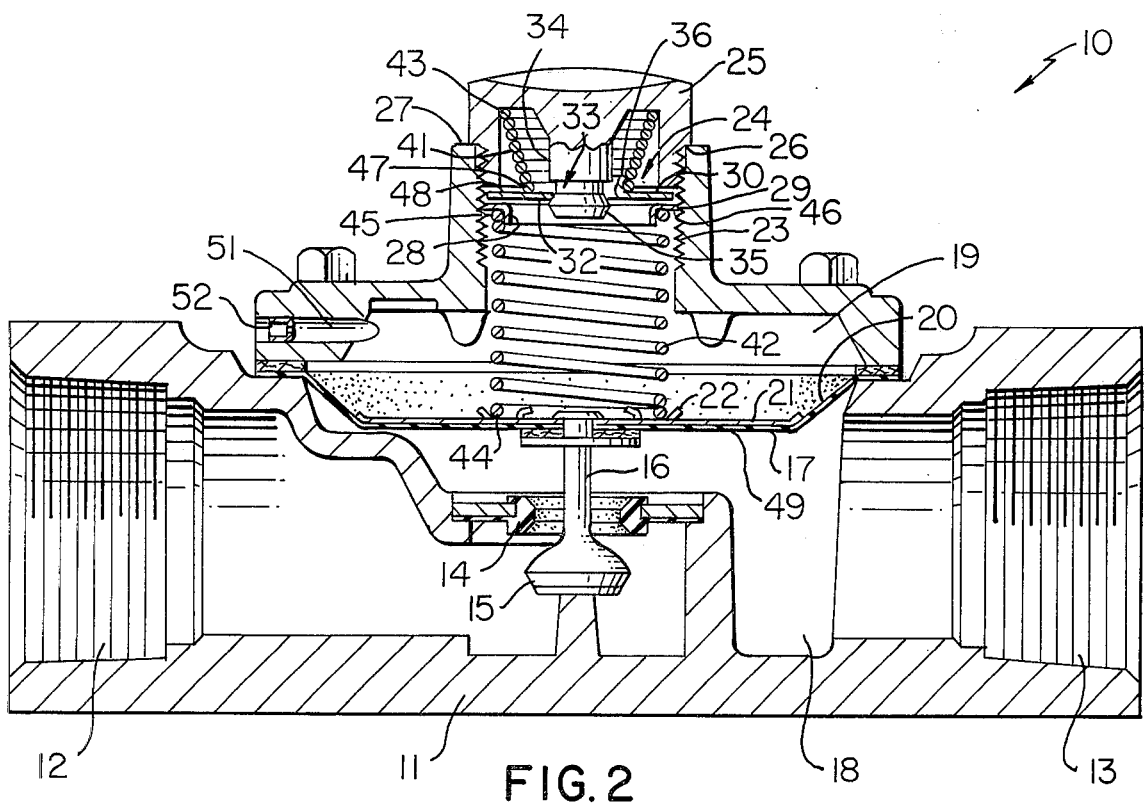
FIG. 2 is a view similar to FIG. 1 and illustrates the changeover spring in a stored condition thereof.

A first spring retainer 28 is of an annular configuration and has its outer periphery 29 formed in such a manner that the same can be threaded into the threaded portion 23 of the housing 11 and thus be positioned in a preselected axial position therein in the manner illustrated in FIGS. 1 and 2.

Another annular spring retainer 30 of this invention is adapted to be loosely disposed in the threaded portion 23 of the housing 11 and be carried by the end cap 25 in the two positions illustrated respectively in FIGS. 1, 3, and 2, 4.

In particular, the spring retainer 30 has a central opening 31 passing therethrough and is cut and formed in such a manner that the same defines a plurality of inwardly directed radially disposed flexible tongues 32 that are disposed in a circular array in the opening 31 and are adapted to snap fit into an annular recess 33 formed in a central projection 34 of the end cap 25 which is adapted to project centrally into the storage space 24 of the housing means 11 in the manner illustrated in FIGS. 1 and 2. The projection 34 of the end cap 25 has a camming surface 35 adjacent the recess 33 to facilitate the snap fitting of the tongues 32 of the spring retainer 30 into and out of recess 33 thereof. The spring retainer 30 also has a plurality of outwardly directed tangs 36 adjacent the opening 31 thereof for a purpose hereinafter described.

The other annular spring retainer 28 also has a central opening 37 passing therethrough and defining a cylindrical flange 38 extending therefrom.

A biasing means of this invention is generally indicated by the reference numeral 40 and comprises a pair of coiled compression springs 41 and 42 adapted to be substantially concentrically disposed in the housing means 11 in the manner illustrated in FIG. 1 with the lower ends 43 and 44 of the springs 41 and 42 respectively bearing against the backup plate 21 of the flexible wall 17 to act in a direction to tend to open the valve member 15 away from the valve seat 14 for a purpose that will be apparent hereinafter, the lower end 44 of the outer spring 42 nesting within the tabs 22 of the backup plate 21 whereby the tabs 22 provide a spring retaining function for the spring 42.

The upper end 45 of the outer spring 42 encircles the cylindrical flange 38 of the threaded spring retainer 28 and bears against the under surface 46 thereof in the manner illustrated in FIGS. 1 and 2.

The upper end 47 of the inner spring 41 encircles the tabs 36 of the spring retainer or collar 30 and bears against the under surface 48 thereof, the tabs 36 being staked over the last coil of the spring 41 at the end 47 thereof to fasten that end 47 of the spring 41 to the spring retainer or collar 30 for a purpose hereinafter described.

In this manner it can be seen that when both springs 41 and 42 are assembled in the housing means 11 in the manner illustrated in FIG. 1, the spring retainers 28 and 30 support the upper ends 45 and 47 of the springs 42 and 41 while the lower ends 43 and 44 thereof respectively act against the flexible wall 17 of the pressure regulator construction 10 to tend to move the valve member 15 away from the valve seat 14 with a certain force that is the sum of the forces of the two springs 41 and 42 acting downwardly in FIG. 1.

Thus, when a fuel source is interconnected to the inlet 12, such as an LPG fuel source, the fuel passes through the open valve seat 14 to the outlet 13. However, the pressure of the fuel passing through the valve seat 14 builds up in the chamber 18 and acts against the other side 49 of the flexible wall 17 in opposition to the force of the springs 41 and 42 and tends to move the valve member 15 upwardly in FIG. 1, and, thus, close the valve seat 14. In this manner, the pressure of the fuel in the chamber 18 and, thus, in the outlet 13, is maintained at a certain pressure value regardless of the pressure value of the fuel being directed to the inlet 12 of the housing means 11 as the position of the valve member 15 relative to the seat 14 will assure that the fuel pressure in the chamber 18 and being directed to the outlet 13 will remain at a certain pressure level as determined by the combined force of the springs 41 and 42 in a manner well known in the art.

Figure 3:
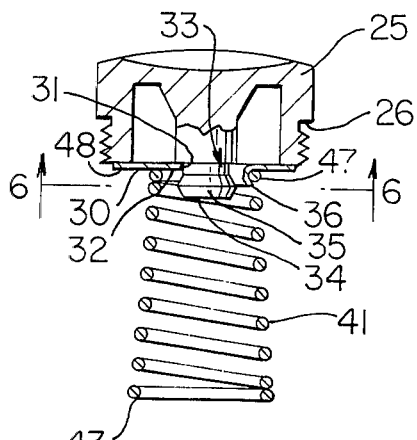
FIG. 3 illustrates the removable cap and changeover spring of the pressure regulator construction of FIG. 1 in the removed condition thereof.

When it is desired to change the pressure range of the pressure regulator construction 10 to another pressure range thereof, such as for being interconnected to a natural gas fuel source, the cap 25 is unthreaded from the threaded portion 23 of the housing 11 and removed therefrom whereby the collar or spring retainer 30 that is snap fitted to the projection 34 of the cap 25 and its interconnected inner spring 41 are removed in unison therewith in the manner illustrated in FIG. 3. Thus, once the cap 25 is completely removed from the housing 11, there is no change that the spring 41 will be separated from the end cap 25 to become lost until the operator turns over the assembly of the interconnected spring 41 and retainer 30 to insert the coiled spring 41 into the storage space 24 of the end cap 25 in a concentric manner about the projection 34 thereof as illustrated in FIG. 4 and pushes inwardly on the collar 30 to again snap fit the tongues 32 thereof into the recess 33 of the end cap 25 whereby the spring 41 is compressed between the snap-fitted retainer 30 and end cap 25 as illustrated in FIG. 4 to become again a self-contained unit which is adapted to be rethreaded into the bore 23 of the housing 11 in the manner illustrated in FIG. 2.

Accordingly, when the pressure regulator construction 10 is in the condition illustrated in FIG. 2, it can be seen that only the compression spring 42 is now acting in a downward direction on the flexible wall 17 so that the valve member 15 is moved away from the valve seat 14 by only the force of the compression spring 42 whereby the pressure regulator construction 10 will tend to maintain a lesser pressure value of the fuel in the chamber 18 and thus, at the outlet 13 thereof than when both the springs 41 and 42 were utilized in the manner illustrated in FIG. 1.

Figure 4:
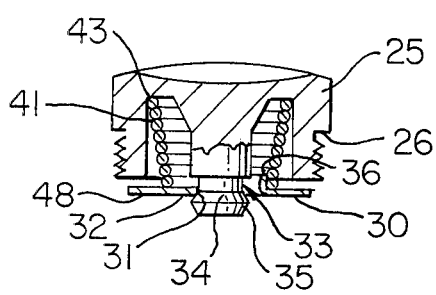
FIG. 4 is a view similar to FIG. 3 and illustrates the removable cap and the changeover spring thereof when removed from the pressure regulator construction of FIG. 2.
Figure 5:
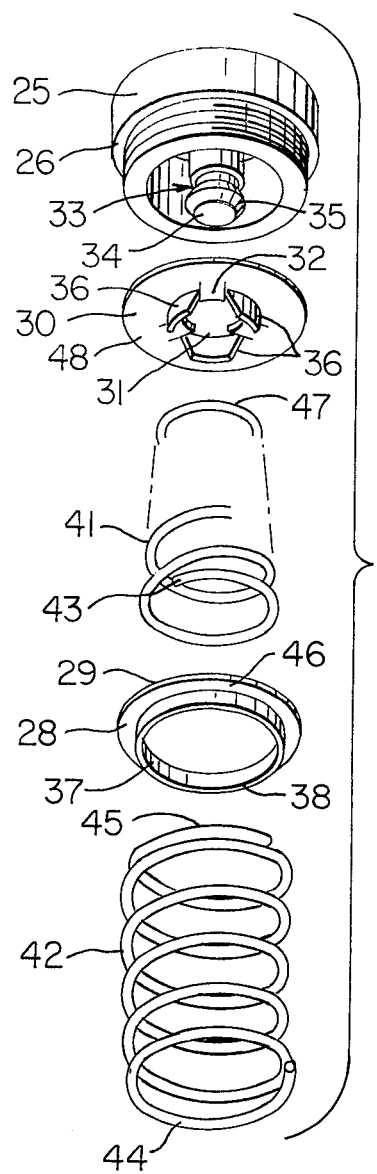
FIG. 5 is an exploded perspective view of the various parts of the removable cap and changeover spring construction.
Figure 6:
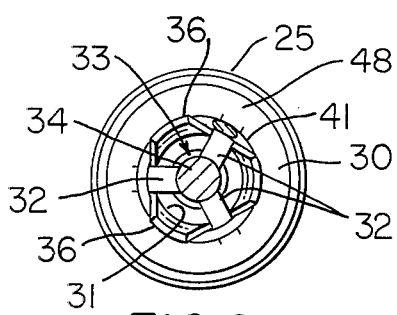
FIG. 6 is a fragmentary cross-sectional view taken on line 6—6 of FIG. 3.
Figure 7:
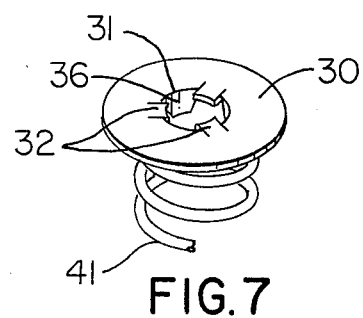
FIG. 7 is a fragmentary perspective view of the removable collar and spring of the regulator of FIG. 1.

Therefore, it can be seen that this invention provides an improved plural range pressure regulator construction that can readily be converted from one pressure range thereof to another pressure range thereof merely by changing the direction or position of one spring assembly thereof from a stored condition thereof as illustrated in FIG. 4 to an active force applying position thereof as illustrated in FIG. 3 in a simple and effective manner without fear of losing the changeover spring 41 as might occur when utilizing the dual range pressure regulator construction of the aforementioned U.S. Pat. No. 3,825,029 to Genbauffe.

Thus, when it is desired to convert the regulator construction 10 from the condition illustrated in FIG. 2 back to the condition illustrated in FIG. 1, the end cap 25 is removed as illustrated in FIG. 4 and the collar 30 is unsnapped from the projection 34 of the end cap 25 so that the assembly of the collar 30 and spring 41 can be changed around to be snapped back on to the projection 34 of the end cap 25 in the manner illustrated in FIG. 3. Thereafter, the assembly of FIG. 3 is replaced into the bore 23 of the housing 11 so that the lower end 43 of the inner spring 41 will again bear against the backup plate 21 of the flexible wall 17. Thus, both springs 41 and 42 will now act on a movable wall 17 for the reasons previously set forth.

Of course, the chamber 19 of the pressure regulator construction is adapted to be interconnected to the atmosphere in any desired manner. For example, in the embodiment illustrated in the drawings, the housing means 11 is provided with the passage means 51 leading from a chamber 19 to the exterior of the housing means 11 and having a suitable restrictor 52 disposed therein to slow down the movement of the diaphragm 17 from its various operating positions in much the same manner as a dash pot arrangement or the like.

Thus, it can be seen that this invention not only provides an improved plural range pressure regulator construction, but also this invention provides an improved cap assembly such a plural range pressure regulator construction or the like.

While the form of this invention now preferred has been described and illustrated as required by the Patent Statute, it is to be understood that other forms can be utilized and still come within the scope of the appended claims.

What is claimed is:

1. In a plural range pressure regulator construction having a spring means for acting on a flexible wall of said construction to provide one pressure range for said regulator construction when said spring means is in a certain position whereof and for being stored in a removable cap of said construction so that said spring means will be in another position thereof and will not act on said wall so as to permit said regulator construction to provide another pressure range thereof, the improvement comprising securing means for securing said spring means to said cap when said spring means is in either of said positions thereof whereby said spring means is adapted to be removed from the housing of said construction in unison with said cap when said cap is removed therefrom and said spring means is in either of said positions thereof.

2. In a plural range pressure regulator construction as set forth in claim 1, the further improvement wherein said spring means is detachably secured to said cap by said securing means when said spring means is in either of said positions thereof whereby said spring means can be removed from said cap.

3. In a plural range pressure regulator construction as set forth in claim 2, the further improvement wherein said securing means comprises a spring retainer against which one end of said spring means is adapted to bear.

4. In a plural range pressure regulator construction as set forth in claim 3, the further improvement wherein said spring retainer has snap-fit means for snap-fitting to said cap to detachably secure said spring retainer to said cap.

5. In a plural range pressure regulator construction as set forth in claim 4, the further improvement wherein said snap-fit means of said spring retainer comprises a plurality of tongues of said spring retainer that are disposed in a circular array.

6. In a plural range pressure regulator construction as set forth in claim 5, the further improvement wherein said cap has a central projection against which said tongues of said spring retainer are adapted to snap-fit.

7. In a plural range pressure regulator construction as set forth in claim 3, the further improvement wherein said one end of said spring means is secured to said spring retainer so as to be carried thereby.

8. In a plural range pressure regulator construction as set forth in claim 7, the further improvement wherein said spring means is substantially conical in configuration with said one end being the smaller end thereof.

9. A removable cap assembly for a plural range pressure regulator construction having a spring means for acting on a flexible wall of said construction to provide one pressure range for said regulator construction when said spring means is in a certain position thereof and for being stored in a removable cap of said construction so that said spring means will be in another position thereof and will not act on said wall so as to permit said regulator construction to provide another pressure range thereof, said assembly comprising said cap, said spring means, and securing means for securing said spring means to said cap when said spring means is in either of said positions thereof whereby said spring means is adapted to be removed from the housing of said construction in unison with said cap when said cap is removed therefrom and said spring means is in either of said positions thereof.

10. An assembly as set forth in claim 9 wherein said spring means is detachably secured to said cap by said securing means when said spring means is in either of said positions thereof whereby said spring means can be removed from said cap.

11. An assembly as set forth in claim 10 wherein said securing means comprises a spring retainer against which one end of said spring means is adapted to bear.

12. An assembly as set forth in claim 10 wherein spring retainer has snap-fit means for snap-fitting to said cap to detachable secure said spring retainer to said cap.

13. An assembly as set forth in claim 12 wherein said snap-fit means of said spring retainer comprises a plurality of tongues of said spring retainer that are disposed in a circular array.

14. An assembly as set forth in claim 13 wherein said cap has a central projection against which said tongues of said spring retainer are adapted to snap-fit.

15. An assembly as set forth in claim 11 wherein said one end of said spring means is secured to said spring retainer so as to be carried thereby.

16. An assembly as set forth in claim 15 wherein said spring means is substantially conical in configuration with said one end being the smaller end thereof.

* * * * *